(12) United States Patent
McCune

(10) Patent No.: US 10,670,132 B2
(45) Date of Patent: *Jun. 2, 2020

(54) ADDITIVE MANUFACTURED GEAR FOR A GEARED ARCHITECTURE GAS TURBINE ENGINE

(71) Applicant: United Technologies Corporation, Farmington, CT (US)

(72) Inventor: Michael E. McCune, Colchester, CT (US)

(73) Assignee: Raytheon Technologies Corporation, Farmington, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/121,929

(22) Filed: Sep. 5, 2018

(65) Prior Publication Data

US 2019/0011033 A1 Jan. 10, 2019

Related U.S. Application Data

(63) Continuation of application No. 14/682,390, filed on Apr. 9, 2015, now Pat. No. 10,371,244.

(51) Int. Cl.
| | |
|---|---|
| *F16H 55/17* | (2006.01) |
| *F16H 1/28* | (2006.01) |
| *B22F 5/08* | (2006.01) |
| *F02C 7/36* | (2006.01) |
| *B22F 3/105* | (2006.01) |
| *B22F 5/00* | (2006.01) |
| *B22F 7/06* | (2006.01) |

(Continued)

(52) U.S. Cl.
CPC ........... *F16H 55/17* (2013.01); *B22F 3/1055* (2013.01); *B22F 5/009* (2013.01); *B22F 5/085* (2013.01); *B22F 7/064* (2013.01); *B22F 7/08* (2013.01); *F02C 7/36* (2013.01); *F16H 1/28* (2013.01); *B22F 2003/247* (2013.01); *F05D 2260/40311* (2013.01); *Y02P 10/295* (2015.11)

(58) Field of Classification Search
CPC ........ F16H 55/17; B22F 3/1055; B22F 5/009; B22F 5/08; B22F 5/085; B22F 7/064; B22F 7/08; Y02P 10/295
See application file for complete search history.

(56) References Cited

U.S. PATENT DOCUMENTS 2,764,900 A * 10/1956 Warsmith ................ F16H 55/06
74/434
4,904,362 A 2/1990 Gaertner et al.
(Continued)

FOREIGN PATENT DOCUMENTS

| DE | 102012102777 A1 | 10/2013 |
|---|---|---|
| DE | 102014003441 A1 | 9/2015 |
| WO | 2014116254 A1 | 7/2014 |

OTHER PUBLICATIONS

European Office Action dated Nov. 28, 2018 for corresponding European Patent Application No. 16164509.8.
(Continued)

*Primary Examiner* — Edwin A Young
(74) *Attorney, Agent, or Firm* — Bachman & LaPointe, P.C.

(57) ABSTRACT

A gear includes a multiple of gear teeth that extend from an outer portion of a rim about an axis and an inner portion of the rim about the axis, the inner portion of the rim additive manufactured.

16 Claims, 8 Drawing Sheets

(51) Int. Cl.
*B22F 7/08* (2006.01)
*B22F 3/24* (2006.01)

(56) References Cited

U.S. PATENT DOCUMENTS

| | | |
|---|---|---|
| 5,364,248 A | 11/1994 | Nakashima et al. |
| 5,433,835 A | 7/1995 | Demaray et al. |
| 5,445,973 A | 8/1995 | Hedstrom |
| 5,470,452 A | 11/1995 | Dickey et al. |
| 5,487,822 A | 1/1996 | Demaray et al. |
| 5,565,071 A | 10/1996 | Demaray et al. |
| 5,571,393 A | 11/1996 | Taylor et al. |
| 5,593,082 A | 1/1997 | Ivanov et al. |
| 5,595,337 A | 1/1997 | Demaray et al. |
| 5,603,816 A | 2/1997 | Demaray et al. |
| 5,653,856 A | 8/1997 | Ivanov et al. |
| 5,685,797 A | 11/1997 | Barnsby et al. |
| 5,725,746 A | 3/1998 | Dickey et al. |
| 5,922,176 A | 7/1999 | Caskey |
| 5,935,391 A | 8/1999 | Nakahigashi et al. |
| 5,972,185 A | 10/1999 | Hendricks et al. |
| 5,985,115 A | 11/1999 | Hartsough et al. |
| 6,068,742 A | 5/2000 | Daxinger et al. |
| 6,077,407 A | 6/2000 | Liehr et al. |
| 6,159,348 A | 12/2000 | Barnsby et al. |
| 6,217,716 B1 | 4/2001 | Fai Lai |
| 6,340,415 B1 | 1/2002 | Raaijmakers et al. |
| 6,436,252 B1 | 8/2002 | Tzatzov et al. |
| 6,444,086 B1 | 9/2002 | Andler et al. |
| 6,588,934 B2 | 7/2003 | Law |
| 7,052,583 B2 | 5/2006 | Navala et al. |
| 7,281,853 B2 | 10/2007 | Duong |
| 7,842,355 B2 | 11/2010 | Stowell |
| 7,879,453 B2 | 2/2011 | Lang et al. |
| 8,147,981 B2 | 4/2012 | Lang et al. |
| 8,182,662 B2 | 5/2012 | Crowley et al. |
| 8,372,734 B2 | 2/2013 | Van Duren et al. |
| 8,500,976 B2 | 8/2013 | Goderis et al. |
| 8,535,490 B2 | 9/2013 | Madocks et al. |
| 8,741,115 B2 | 6/2014 | Yumshtyk et al. |
| 10,371,244 B2 * | 8/2019 | McCune ............... B22F 3/1055 |
| 2013/0192264 A1 | 8/2013 | McCune et al. |
| 2014/0155219 A1 | 6/2014 | McCune et al. |
| 2015/0323053 A1 | 11/2015 | El-Wardany et al. |

OTHER PUBLICATIONS

European Search Report for Application No. 16164509.8 dated Aug. 24, 2016.

* cited by examiner

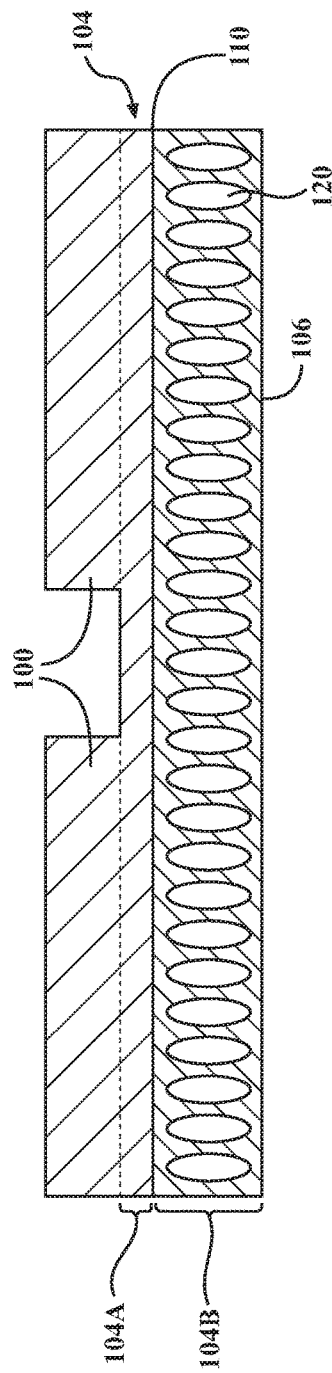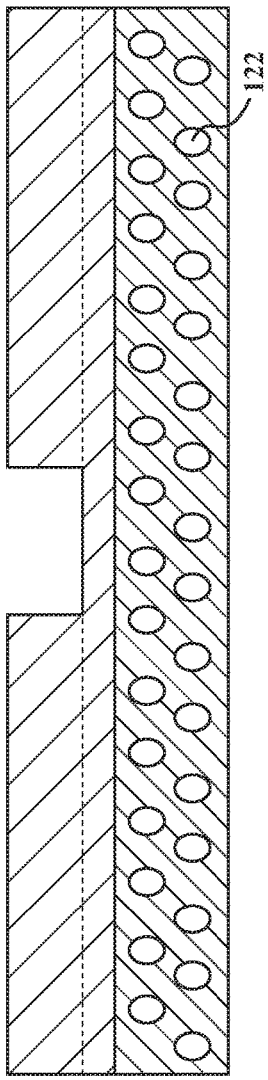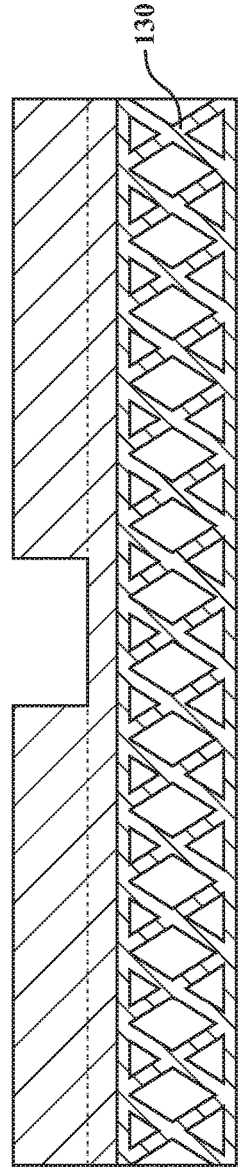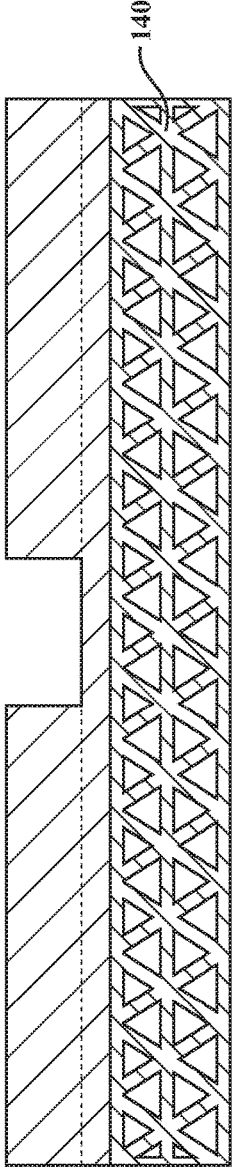

ADDITIVE MANUFACTURED GEAR FOR A GEARED ARCHITECTURE GAS TURBINE ENGINE

CROSS REFERENCE TO RELATED APPLICATIONS

This application is a continuation application of U.S. patent application Ser. No. 14/682,390 filed Apr. 9, 2015.

BACKGROUND

The present disclosure relates to a gas turbine engine and, more particularly, to a geared architecture with an additive manufactured gear therefor.

Epicyclical gear systems with planetary or star gearboxes may be used in gas turbine engines for their compact design and efficient high gear reduction capabilities. Planetary and star gearboxes generally include three gear train elements: a central sun gear, an outer ring gear with internal gear teeth, and a plurality of planet gears supported by a planet carrier between, and in meshed engagement with, both the sun gear and the ring gear. The gear train elements share a common longitudinal central axis, about which at least two rotate.

In a star gear design, the planet carrier is stationary and the output shaft is driven by the ring gear in a direction opposite that of the sun gear. In a planetary gear design, the carrier rotates which may cause the weight of the planet gear to apply a centrifugal load to the planet bearing. In geared architecture gas turbine engines, this load may be significant and can even be higher than the total torque load of the engine.

In some current geared architectures, the star/planet gear rims include axial lightening apertures to reduce gear weight. This may be effective with relatively low load journal bearings or small diameters, however, as load or diameter increases, the difference in radial stiffness of the rim at the lightening apertures as compared to between the lightening apertures, may effect performance.

SUMMARY

A gear according to one disclosed non-limiting embodiment of the present disclosure can include a multiple of gear teeth that extend from an outer portion of a rim about an axis and an inner portion of the rim about the axis, the inner portion of the rim additive manufactured.

A further embodiment of any of the foregoing embodiments of the present disclosure may include, wherein the inner portion of the rim forms an journal bearing surface.

A further embodiment of any of the foregoing embodiments of the present disclosure may include, wherein the gear is an intermediate gear of a geared architecture for a gas turbine engine.

A further embodiment of any of the foregoing embodiments of the present disclosure may include, wherein the geared architecture includes a planetary gear system.

A further embodiment of any of the foregoing embodiments of the present disclosure may include, wherein the geared architecture includes a star gear system.

A further embodiment of any of the foregoing embodiments of the present disclosure may include, wherein the inner portion of the rim includes a matrix.

A further embodiment of any of the foregoing embodiments of the present disclosure may include, wherein the matrix forms a lattice structure.

A further embodiment of any of the foregoing embodiments of the present disclosure may include, wherein the gear is an intermediate gear of a geared architecture for a gas turbine engine, the intermediate gear is a double helical gear.

A further embodiment of any of the foregoing embodiments of the present disclosure may include, wherein the inner portion provides different characteristics along an axial length.

A geared architecture for a gas turbine engine, the geared architecture, according to one disclosed non-limiting embodiment of the present disclosure can include a multiple of intermediate gears in meshing engagement with a sun gear and a ring gear, each of the multiple of intermediate gears including an inner portion of a rim, the inner portion of the rim being additive manufactured.

A further embodiment of any of the foregoing embodiments of the present disclosure may include, wherein an outer portion of the rim includes a multiple of gear teeth, the gear teeth manufactured via subtractive manufacturing.

A further embodiment of any of the foregoing embodiments of the present disclosure may include, wherein the inner portion of the rim forms an inner periphery.

A further embodiment of any of the foregoing embodiments of the present disclosure may include an interface between the inner portion of the rim and the outer portion of the rim.

A further embodiment of any of the foregoing embodiments of the present disclosure may include, wherein the interface is a bond layer.

A further embodiment of any of the foregoing embodiments of the present disclosure may include, wherein the inner portion of the rim forms a matrix.

A further embodiment of any of the foregoing embodiments of the present disclosure may include, wherein each of the multiple of intermediate gears is a double helical gear.

A further embodiment of any of the foregoing embodiments of the present disclosure may include, wherein the inner portion provides different characteristics along an axial length.

A method of manufacturing gear according to one disclosed non-limiting embodiment of the present disclosure can include subtractive manufacturing a multiple of gear teeth from and an outer portion of a rim and additive manufacturing an inner portion of the rim.

A further embodiment of any of the foregoing embodiments of the present disclosure may include additive manufacturing the inner portion of the rim as a matrix structure.

A further embodiment of any of the foregoing embodiments of the present disclosure may include additive manufacturing the inner portion of the rim to provide different characteristics along an axial length.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 7 is a schematic sectional view of a gear with an additive manufactured inner rim according to one disclosed non-limiting embodiment;

FIG. 10 is a schematic sectional view of a gear with an additive manufactured inner rim according to one disclosed non-limiting embodiment;

FIG. 11 is a schematic sectional view of a gear with an additive manufactured inner rim according to one disclosed non-limiting embodiment;

FIG. 12 is a schematic sectional view of a gear with an additive manufactured inner rim according to one disclosed non-limiting embodiment;

DETAILED DESCRIPTION

Figure 1:
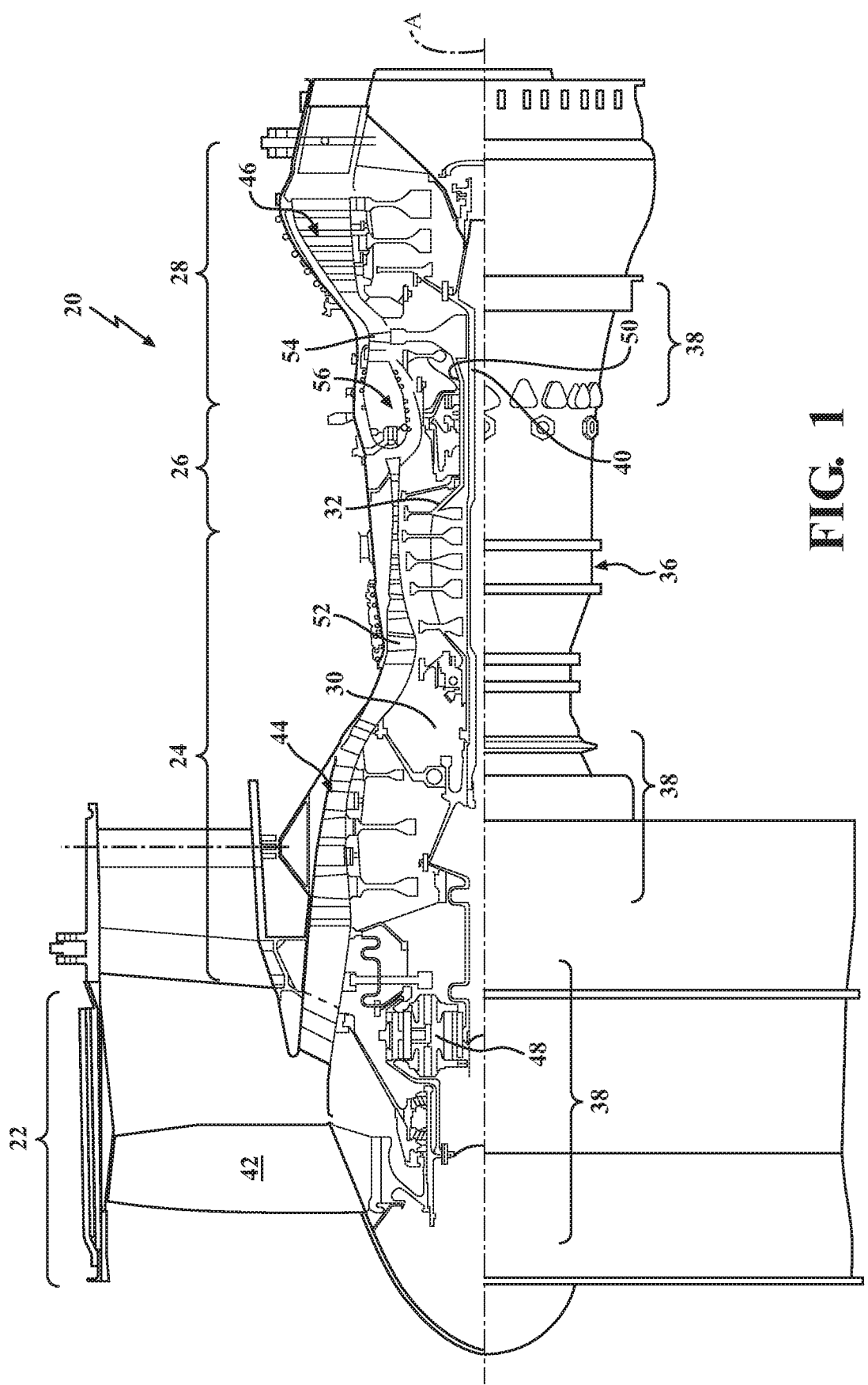
FIG. 1 is a schematic cross-sectional view of a geared architecture gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. Although schematically illustrated as a turbofan in the disclosed non-limiting embodiment, it should be appreciated that the concepts described herein are not limited to use with turbofans.

The fan section 22 drives air along a bypass flowpath and a core flowpath while the compressor section 24 drives air along the core flowpath for compression and communication into the combustor section 26, then expansion through the turbine section 28. The engine 20 generally includes a low spool 30 and a high spool 32 mounted for rotation about an engine central longitudinal axis A relative to an engine case assembly 36 via several bearing compartments 38.

The low spool 30 generally includes an inner shaft 40 that interconnects a fan 42, a low-pressure compressor ("LPC") 44 and a low-pressure turbine ("LPT") 46. The inner shaft 40 drives the fan 42 through a geared architecture 48 to drive the fan 42 at a lower speed than the low spool 30. The high spool 32 includes an outer shaft 50 that interconnects a high-pressure compressor ("HPC") 52 and high-pressure turbine ("HPT") 54. A combustor 56 is arranged between the HPC 52 and the HPT 54. The inner shaft 40 and the outer shaft 50 are concentric and rotate about the engine central longitudinal axis A that is collinear with their longitudinal axes.

Core airflow is compressed by the LPC 44 then the HPC 52, mixed with the fuel and burned in the combustor 56, then expanded over the HPT 54 and the LPT 46. The LPT 46 and the HPT 54 drive the respective low spool 30 and high spool 32 in response to the expansion.

In one example, the gas turbine engine 20 is a high-bypass geared architecture engine in which the bypass ratio is greater than about six (6:1). The geared architecture 48 can include an epicyclic gear system 58, such as a planetary gear system (FIG. 2), a star gear system (FIG. 3) or other system. The epicyclic gear train is one example, has a gear reduction ratio of greater than about 2.3, and in another example is greater than about 2.5 with a gear system efficiency greater than approximately 98%. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be appreciated, however, that the above parameters are but one embodiment of a geared architecture engine and that the present disclosure is applicable to other gas turbine engines including direct drive turbofans.

In one non-limiting embodiment, a significant amount of thrust is provided by the bypass flow due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("T"/518.7)$^{0.5}$ in which "T" represents the ambient temperature in degrees Rankine. The Low Corrected Fan Tip Speed according to one non-limiting embodiment of the example gas turbine engine 20 is less than about 1150 fps (351 m/s).

Figure 4:
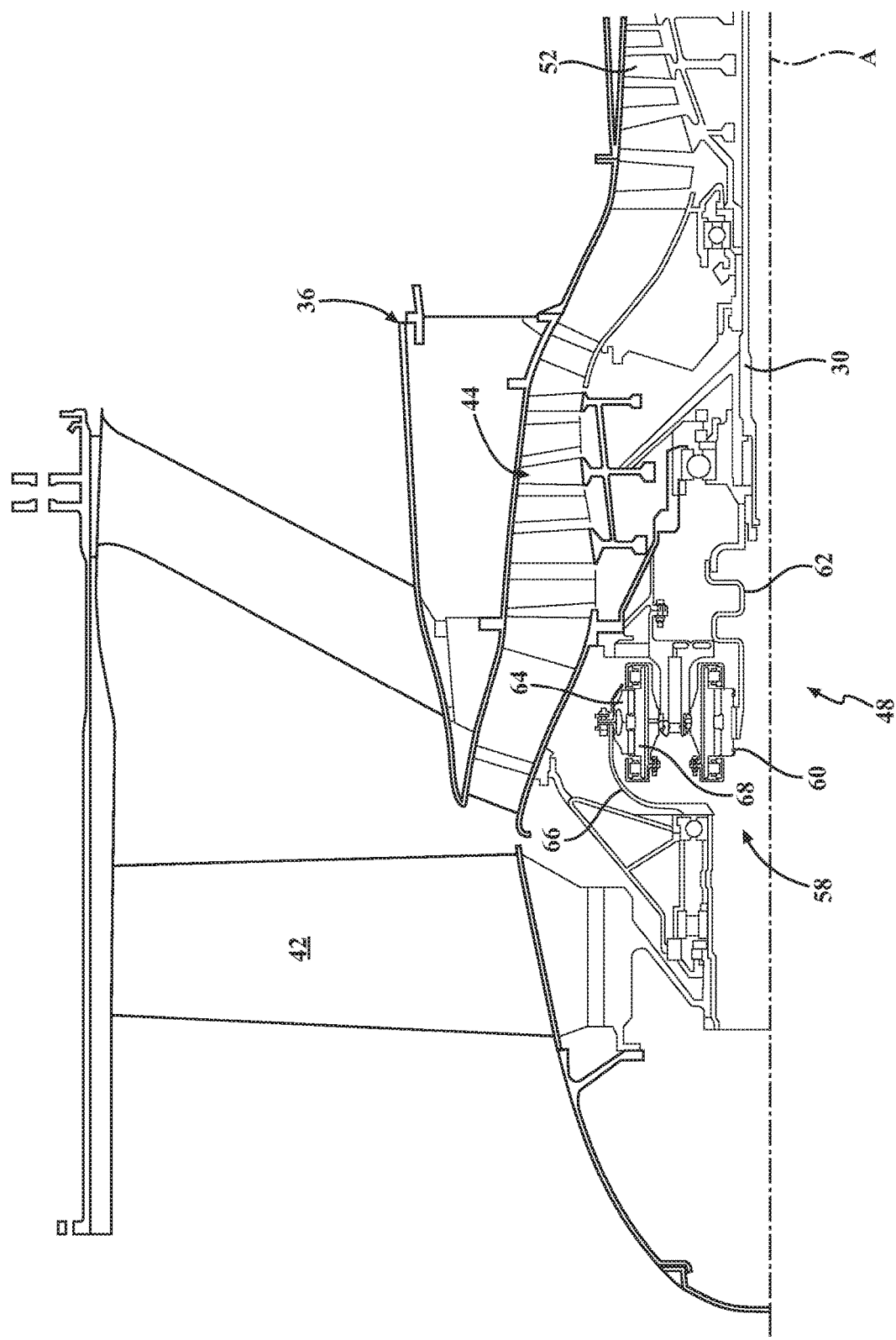
FIG. 4 is an sectional view of the gas turbine engine.

With reference to FIG. 4, the epicyclic gear system 58 generally includes a sun gear 60 driven by a flexible input shaft 62 driven by the low spool 30, a ring gear 64 connected to a ring gear output shaft 66 which connects the geared architecture 48 with the fan 42, and a set of intermediate gears 68 in meshing engagement with the sun gear 60 and ring gear 64. The flexible input shaft 62 transfers torque as well as facilitates the segregation of vibrations and other transients.

Figure 2:
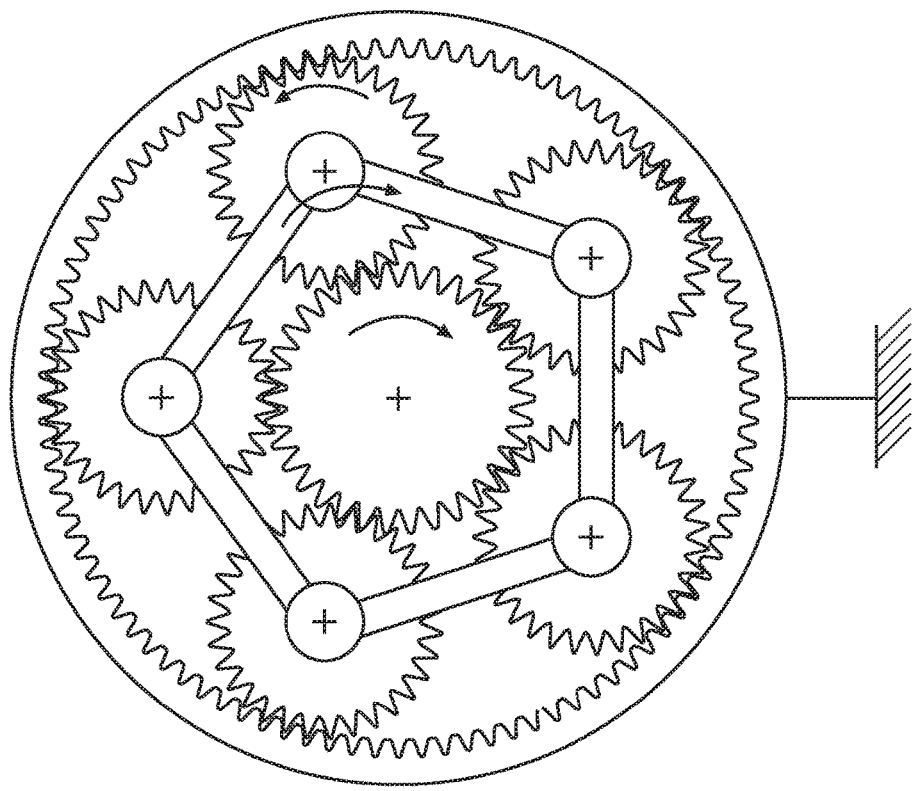
FIG. 2 is an schematic front view of a planetary gear system type epicyclic gear system of the geared architecture according to one disclosed non-limiting embodiment.
Figure 3:
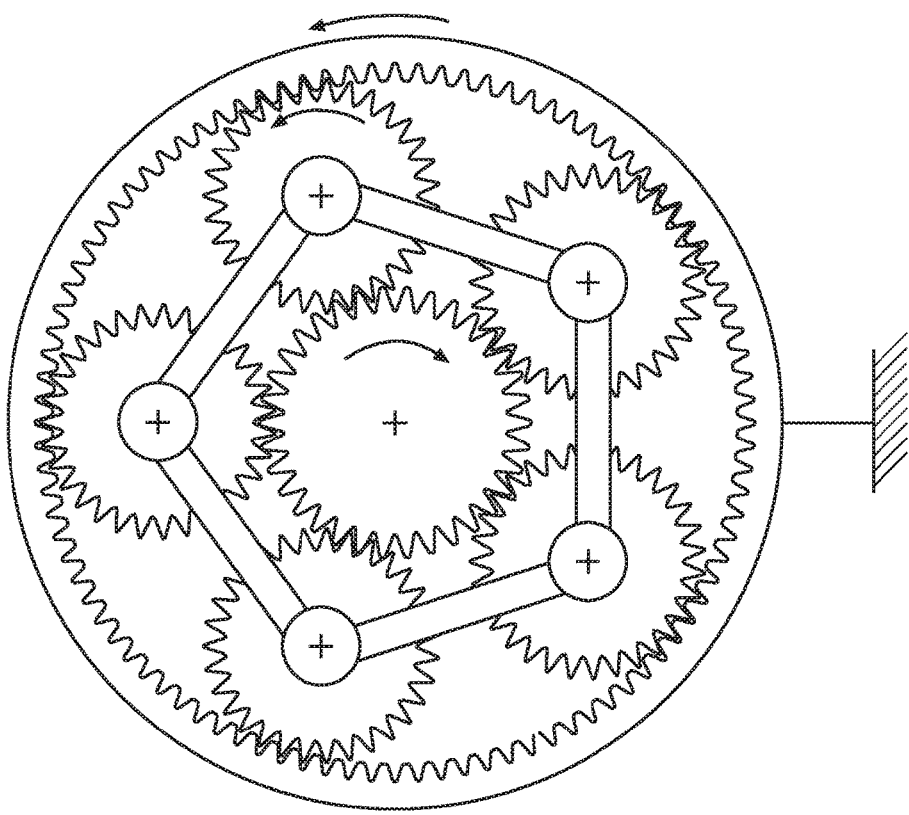
FIG. 3 is an schematic front view of a star gear type epicyclic gear system of the geared architecture according to another disclosed non-limiting embodiment.
Figure 5:
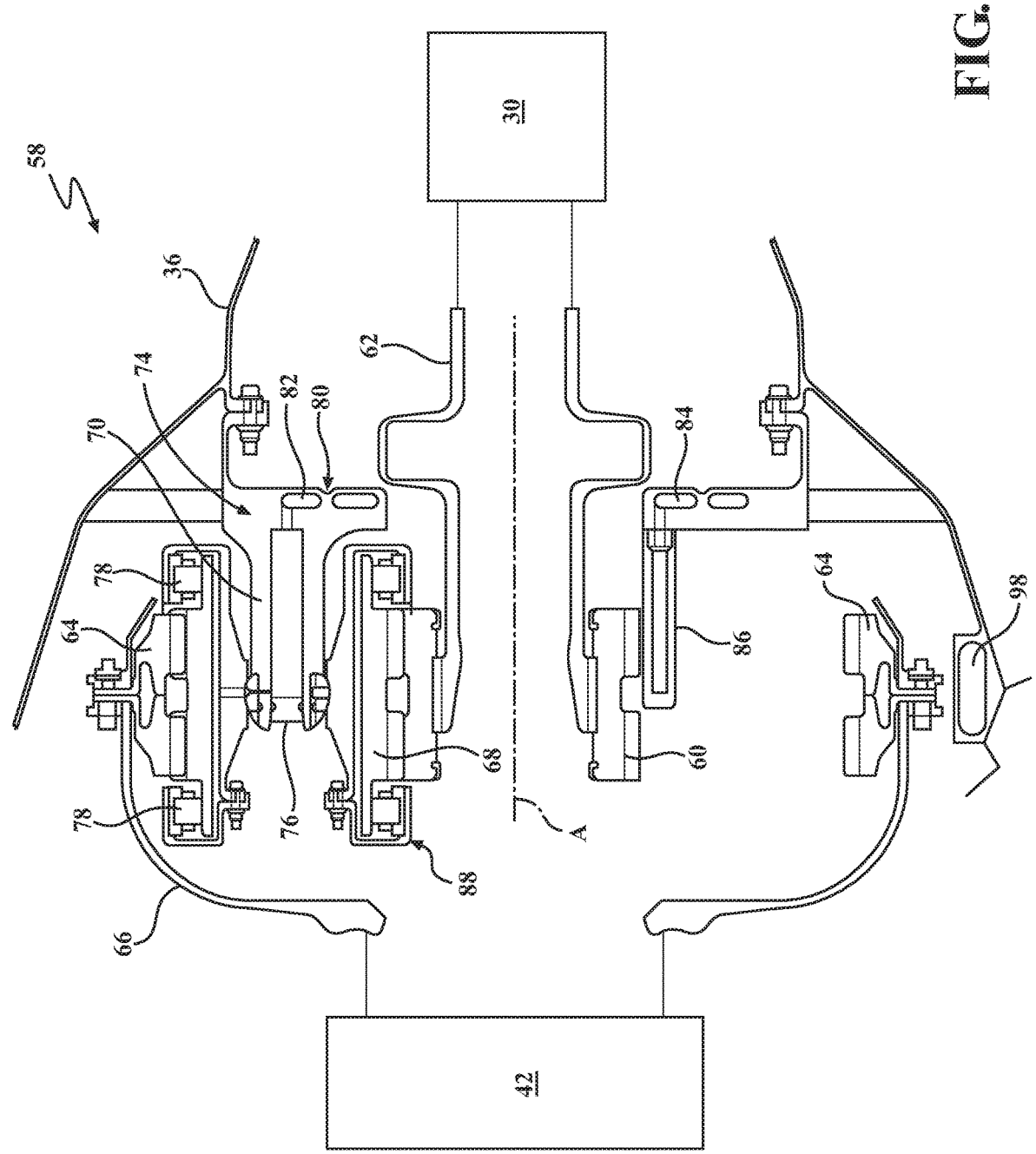
FIG. 5 is a sectional view of the epicyclic gear system.

With reference to FIG. 5, each intermediate gear 68 is rotationally mounted about a non-rotating flexible carrier post 70 that is respectively supported by a carrier 74 rotationally fixed to the engine case assembly 36. In another, disclosed, non-limiting embodiment, the carrier may rotate while the ring gear is fixed (FIG. 2). Each of the intermediate gears 68 is rotationally mounted on a respective spherical joint 76 mounted to each of the non-rotating flexible carrier posts 70. The spherical joint 76 and non-rotating flexible carrier posts 70 allow the system to flex or "squirm" to reduce misalignment and minimize loads upon the intermediate gears 68 as well as permit the use of relatively large rolling element bearings 78 such as cylindrical roller or ball bearings. That is, the spherical joints 76 permit angular movement of the non-rotating flexible carrier posts 70 with minimal, if any, effect upon the intermediate gears 68.

Figure 6:
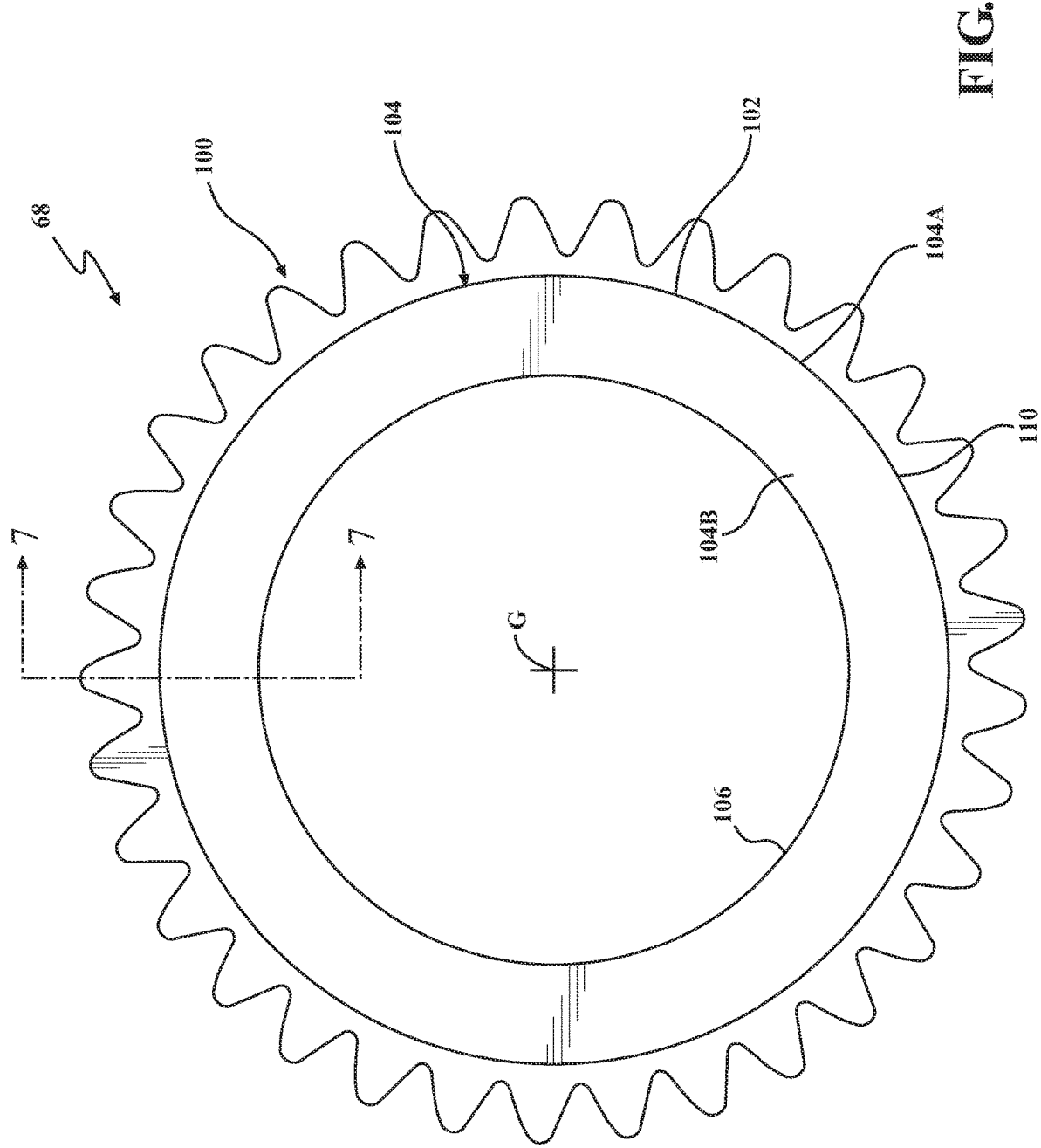
FIG. 6 is a plan view of a gear with an additive manufactured inner rim according to one disclosed non-limiting embodiment.

With reference to FIG. 6, each intermediate gears 68 generally includes gear teeth 100 that extend from a rim 102 that forms an inner diameter about an axis G. The inner diameter provides a journal bearing surface 106 for the respective spherical joint 76 (FIG. 5). It should be appreciated that although an intermediate gear 68, often referred to as a planet gear, is illustrated in this disclosed non-limiting embodiment, other gears will also benefit herefrom. It should be appreciated that journal bearing surface 106 may be any interior surface upon which the intermediate gear 68 is mounted.

With reference to FIG. 7, in this disclosed non-limiting embodiment, the gear teeth 100 that extend from an outer portion 104A of the rim 104 are manufactured of a material such as an alloy steel that is machined via conventional subtractive manufacturing process while an inner portion 104B of the rim 104, inclusive of the journal bearing surface 106, is manufactured by an additive manufacturing process. The additive manufacturing process includes, but are not limited to, Selective Laser Sintering (SLS), Electron Beam Sintering (EBS), Electron Beam Melting (EBM), Electron Beam Powder Bed Fusion (EB-PBF), Electron Beam Powder Wire (EBW), Laser Engineered Net Shaping (LENS), Laser Net Shape Manufacturing (LNSM), Direct Metal Deposition (DMD), and Laser Powder Bed Fusion (L-PBF).

The additive manufacturing process sequentially builds-up layers of atomized alloy and/or ceramic powder material that include but are not limited to, 625 Alloy, 718 Alloy, 230 Alloy, stainless steel, tool steel, cobalt chrome, titanium, nickel, aluminum and others in atomized powder material form. Alloys such as 625, 718 and 230 may have specific benefit for parts that operate in high temperature environments, such as, for example, environments typically encountered by aerospace and gas turbine engine components.

The inner portion 104B of the rim 104, inclusive of the journal bearing surface 106 is additive manufactured. The inner portion 104B of the rim 104 may be additive manufactured of a material similar or different than that of the gear teeth 100 that extend from an outer portion 104A. In one example, the gear teeth 100 and the outer portion 104A of the rim 104 may be manufactured of a gear steel such as AMS6265, and the inner portion 104B of the rim 104 may be manufactured of tool steel.

Figure 8:
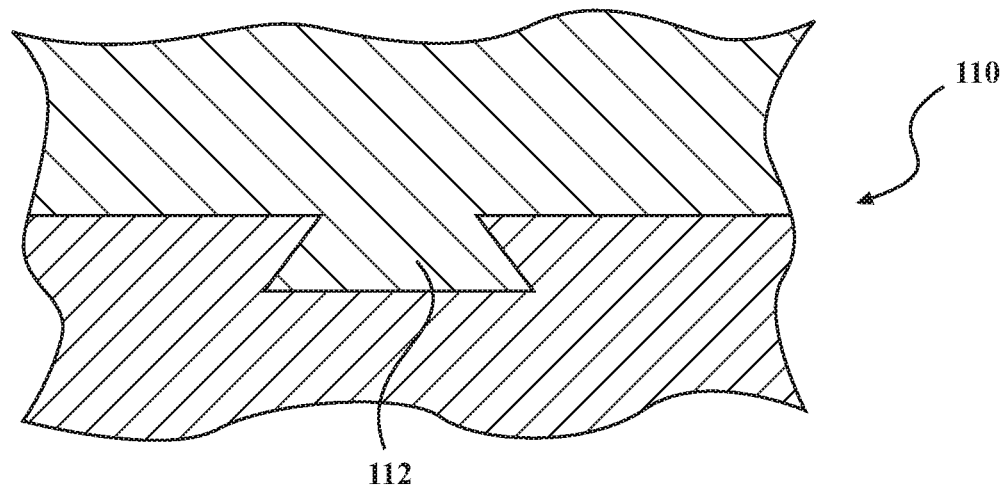
FIG. 8 is an expanded schematic transverse sectional view of a gear with an additive manufactured inner rim and mechanical interface according to one disclosed non-limiting embodiment.

Additive manufacturing of the inner portion 104B facilitates conventional subtractive manufacturing of the gear teeth 100 that extend from an outer portion 104A yet allows a relatively thick, but lightweight, inner portion 104B of the rim 104. That is, the other portion 104A is essentially a thin ring. Additive manufacturing also permits material selection that withstands carburization temperatures and avoids the heretofore requirement of bonding, as the inner portion 104B of the rim 104 is additive manufactured, essentially laser welded thereto, to the outer portion 104A at an interface 110. The interface 110 may be of various geometries to facilitate mechanical interlock therebetween. In one example, the interface 110 is a mechanical interlock 112 (FIG. 8) therebetween. That is, the mechanical interlock facilitates receipt of the additive manufactured material.

Figure 9:
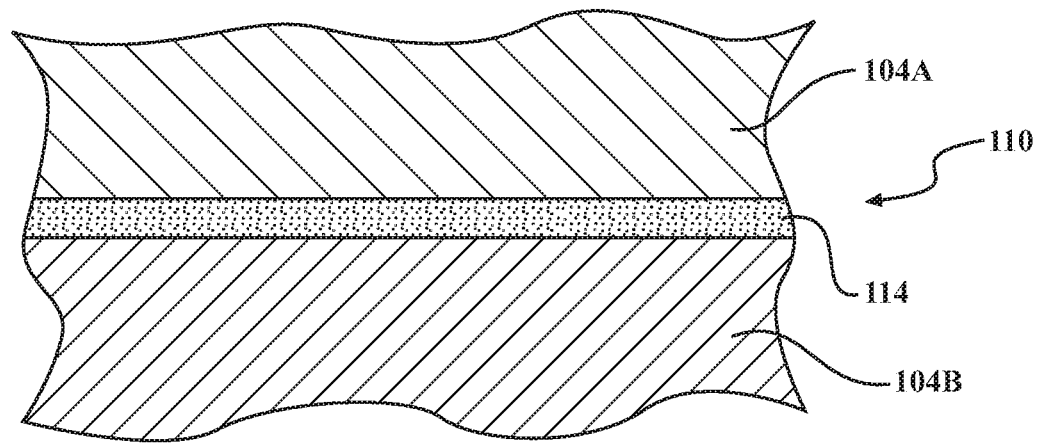
FIG. 9 is an expanded schematic transverse sectional view of a gear with an additive manufactured inner rim and bond layer interface according to another disclosed non-limiting embodiment.

In another disclosed non-limiting embodiment, the interface 110 is a bond layer 114 that facilitates receipt of a dissimilar material that is applied to the outer portion 104A of the rim 104 via an additive manufacturing process (FIG. 9). For example, a nickel material may be applied via an additive manufacturing process as a bond layer to facilitate integration of a titanium material inner portion 104B of the rim 104. That is, gear steel material may not readily receive titanium material directly thereto, such that the nickel bond layer 114 provides an effective interface therebetween.

With continued reference to FIG. 7, in another disclosed non-limiting embodiment, the inner portion 104B of the rim 104 is additive manufactured to form a matrix with, for example, a multiple of apertures 120. In this disclosed non-limiting embodiment, the apertures 120 may be oval shaped, however, various other shapes such as circular apertures 122 (FIG. 10), and various geometric arrangements thereof, may be utilized.

With reference to FIG. 11, in another disclosed non-limiting embodiment, the inner portion 104B of the rim 104 is additive manufactured to form a matrix that defines a lattice structure 130. In this example, the lattice structure 130 includes numerous contiguous "X" shapes, while another example may form multiple triangular shapes (FIG. 12). It should be appreciated that various configurations will benefit herefrom. These various matrix shapes provide weight reduction with a uniform stiffness to support the journal bearing operation.

Figure 13:
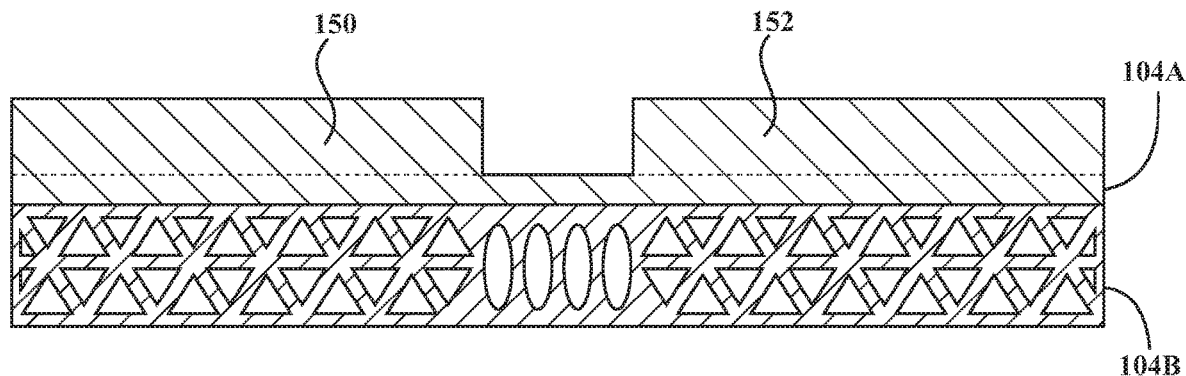
FIG. 13 is a schematic sectional view of a gear with an additive manufactured inner rim according to one disclosed non-limiting embodiment.

With reference to FIG. 13, in another disclosed non-limiting embodiment, the inner portion 104B of the rim 104, is additive manufactured to provide a tailored stiffness along an axial length to increase bearing performance. That is, the inner portion 104B of the rim 104 need not be of a consistent architecture and may provide specific characteristics along an axial length with respect to, for example, a first helix 150 and a second helix 152 of a double helical, or herringbone gear, to provide a uniform stiffness when in operation. Additive manufacturing thereby facilitates optimization of weight reduction and strength.

Figure 14:
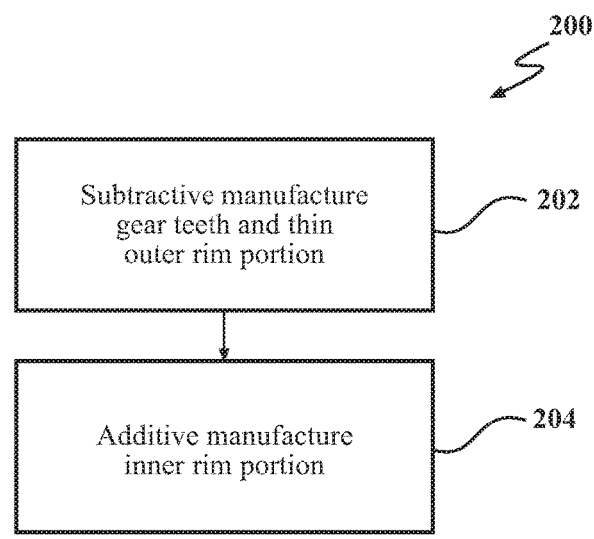
FIG. 14 is a block diagram of a method to manufacture a gear with an additive manufactured inner rim according to one disclosed non-limiting embodiment.

With reference to FIG. 14, a method 200 to manufacture a gear, according to one disclosed non-limiting embodiment, manufacture of the gear teeth 100 and the outer portion 104A of the rim 104 are subtractive manufactured (step 202). That is, the gear teeth 100 are machined so that only a thin outer portion 104A is provided. Next, the inner portion 104B of the rim 104 is additive manufactured to the outer portion 104A of the rim 104 (step 204).

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A gear, comprising:
   a multiple of gear teeth that extend from an outer portion of a rim about an axis; and
   an inner portion of said rim about said axis, said inner portion of said rim additive manufactured to the outer portion at a mechanical interface.

2. The gear as recited in claim 1, wherein said inner portion of said rim forms a journal bearing surface.

3. The gear as recited in claim 1, wherein said inner portion of said rim includes a matrix.

4. The gear as recited in claim 3, wherein said matrix forms a lattice structure.

5. The gear as recited in claim 1, wherein said gear is an intermediate gear of a geared architecture for a gas turbine engine, said intermediate gear is a double helical gear.

6. The gear as recited in claim 1, wherein said inner portion provides different characteristics along an axial length.

7. The gear as recited in claim 1, wherein said interface is a bond layer that facilitates receipt of a dissimilar material that is applied to said outer portion of said rim via an additive manufacturing process.

8. A geared architecture for a gas turbine engine, said geared architecture, comprising:
   a sun gear;
   a ring gear that surrounds said sun gear; and
   a multiple of intermediate gears in meshing engagement with said sun gear and said ring gear, each of said multiple of intermediate gears including an inner portion of a rim, said inner portion of said rim being additive manufactured, and a multiple of gear teeth that extend from an outer portion of said rim of each of said multiple of intermediate gears about an axis, said inner portion of said rim additive manufactured to the outer portion at a mechanical interface, said gear teeth manufactured via subtractive manufacturing.

9. The geared architecture as recited in claim 8, wherein said inner portion of said rim forms an inner periphery.

10. The geared architecture as recited in claim 8, wherein said mechanical interface comprises a dovetail.

11. The geared architecture as recited in claim 8, wherein said inner portion of said rim forms a matrix that defines a lattice structure.

12. The geared architecture as recited in claim 8, wherein each of said multiple of intermediate gears is a double helical gear.

13. The geared architecture as recited in claim 12, wherein said inner portion provides different characteristics along an axial length.

14. A method of manufacturing a gear, comprising:
   subtractive manufacturing a multiple of gear teeth from an outer portion of a rim; and
   additive manufacturing an inner portion of the rim to the outer portion at a mechanical interface.

15. The method as recited in claim 14, further comprising additive manufacturing the inner portion of the rim as a matrix structure.

16. The method as recited in claim 15, further comprising additive manufacturing the inner portion of the rim to provide different characteristics along an axial length.

* * * * *